(12) United States Patent
Grunert et al.

(10) Patent No.: US 11,234,518 B2
(45) Date of Patent: Feb. 1, 2022

(54) CLEAT CONNECTOR

(71) Applicant: VBC Tracy LLC, Philadelphia, PA (US)

(72) Inventors: Matthew Grunert, Seattle, WA (US); Will Root, Seattle, WA (US); Mark Buhr, Chandler, AZ (US); Donald Shultz, Fountain Hills, AZ (US); Kyle DeHaven, Mercer Island, WA (US)

(73) Assignee: VBC Tracy LLC, Philadelphia, PA (US)

( * ) Notice: Subject to any disclaimer, the term of this patent is extended or adjusted under 35 U.S.C. 154(b) by 0 days.

(21) Appl. No.: 16/881,664

(22) Filed: May 22, 2020

(65) Prior Publication Data

US 2020/0367650 A1    Nov. 26, 2020

Related U.S. Application Data

(60) Provisional application No. 62/851,328, filed on May 22, 2019.

(51) Int. Cl.
| A47B 95/00 | (2006.01) |
| F16B 5/06 | (2006.01) |
| A47B 96/06 | (2006.01) |

(52) U.S. Cl.
CPC .......... *A47B 95/008* (2013.01); *A47B 96/067* (2013.01); *F16B 5/0621* (2013.01); *F16B 5/0685* (2013.01)

(58) Field of Classification Search
CPC ..... A47B 95/008; A47B 96/067; A47B 96/06; A47B 96/1441; F16B 5/0624; F16B 5/0685; F16B 5/121; F16B 5/0621
USPC ........................................................ 312/245
See application file for complete search history.

(56) References Cited

U.S. PATENT DOCUMENTS

| 3,487,446 A | * | 12/1969 | Muller ................. | A47B 95/008 |
| | | | | 248/222.41 |
| 4,456,211 A | * | 6/1984 | Wyckoff ................ | A47B 57/42 |
| | | | | 248/544 |

FOREIGN PATENT DOCUMENTS

| DE | 102009044685 A1 | * | 7/2010 | ............... F16B 5/01 |
| EP | 1352593 A1 | * | 10/2003 | .......... A47B 95/008 |
| EP | 1535539 A1 | * | 6/2005 | .......... A47B 95/008 |
| FR | 2833821 A1 | * | 6/2003 | .......... A47B 95/008 |
| GB | 2444897 A | * | 6/2008 | .......... A47B 95/008 |

* cited by examiner

*Primary Examiner* — Andrew M Roersma
(74) *Attorney, Agent, or Firm* — Volpe Koenig

(57) ABSTRACT

A cleat connector for mounting a cabinet is provided including a substantially cylindrical body and a slot. The substantially cylindrical body has a perimeter and a diameter that corresponds to an opening in a back of a cabinet. The slot extends from the perimeter partially into the body. A cabinet and method of installation is also provided.

18 Claims, 12 Drawing Sheets

DETAIL D

DETAIL C

1200

Receive a cabinet including a first cleat connector installed in a first opening in a back of the cabinet and a second cleat connector installed in a second opening in the back of the cabinet. — 1210

Install a rail including a first flange and a second flange by attaching the first flange to a wall with the second flange extending away from the wall at an angle. — 1220

Slide the second flange of the rail into the slot of the first cleat connector and the slot of the second cleat connector. — 1230

FIG. 12

CLEAT CONNECTOR

CROSS REFERENCE TO RELATED APPLICATION

This application claims the benefit of U.S. Provisional Application No. 62/851,328 filed on May 22, 2019 for CLEAT CONNECTOR, which is incorporated by reference as if fully set forth.

FIELD OF INVENTION

The present invention relates generally to a connector, and more specifically to a connector that connects a cabinet to a wall.

BACKGROUND

Cleat hanging systems including Z-clips, French cleats, kerf cleats, and European rail systems are a common solution to hang cabinets. However, these cleat systems have a variety of drawbacks. Z-clips may be used to mount a single cabinet. However, the design of the Z-clip is typically contained within the width of the cabinet so that it is fully concealed thereby preventing a continuous rail from being used. Because a continuous rail cannot be used, installation and leveling is complicated. A French cleat may be used to mount cabinets. A French cleat involves mounting the cabinet onto a chamfered wood cleat. However, the French cleat requires a specialized corresponding cutout on the cabinet which may not be a viable option on certain cabinet designs. A kerf cleat may also be used to mount cabinets. The kerf cleat involves a single diagonal cut in a board mounted on the cleat. However, this design requires direct connection between the particle board and the metal cleat. A European rail system may be used to mount cabinets. These systems are advanced but typically are more expensive, require a large number of hardware parts, and often require special cutouts in the cabinetry.

SUMMARY

A cleat connector for mounting a cabinet is provided including a substantially cylindrical body and a slot. The substantially cylindrical body has a perimeter and a diameter that corresponds to a hole in a back of a cabinet. The slot extends from the perimeter into the body.

The perimeter of the cleat connector may include a flat portion adjacent to the slot. The perimeter may include ridges. The diameter of the substantially cylindrical body may be approximately 20 mm. The slot may include a length that is approximately 15.87 mm.

The cleat connector may include a flange attached to the perimeter adjacent to the slot. The cleat connector may include an edge that extends past the perimeter. The cleat connector may include an alignment pin attached to the perimeter. The cleat connector may include a second partial cylindrical body attached to the perimeter.

A cabinet is also provided including a back, a first cleat connector, and a second cleat connector. The back of the cabinet includes a first hole in a first end and a second hole in a second end. The first cleat connector is installed in the first hole, and the second cleat connector is installed in the second hole. The cleat connectors include the same details and embodiments previously discussed.

A method of installing a cabinet is also provided including receiving the cabinet previously described, installing a rail having a first flange and a second flange by attaching the first flange to the wall with the second flange extending away from the wall, and sliding the second flange of the rail into the slot of the first and second cleat connectors. The second flange of the rail may extend away from the wall at a 45 degree angle.

BRIEF DESCRIPTION OF THE DRAWINGS

The foregoing summary, as well as the following detailed description will be better understood when read in conjunction with the appended drawings. For the purpose of illustration, there is shown in the drawings different embodiments. It should be understood, however, that the teachings are not limited to the precise cleat connector shown.

FIG. 12 is a flow chart of a method of installing a cabinet.

DETAILED DESCRIPTION

A cleat connector that installs in the back of a cabinet and allows the cabinet to be quickly and easily mounted to a wall is provided. The cleat connector fits snugly into an opening of the back of a cabinet. The cleat connector hangs the cabinet on a mounting structure such as a rail system or a Z bracket. The mounting structure is mounted to the wall. The cleat connector includes a substantially cylindrical body that fits into the opening of the cabinet. The body of the cleat connector includes a perimeter and a slot that extends from the perimeter into the body. The slot of the cleat connector is configured to receive the mounting structure.

Figure 1:
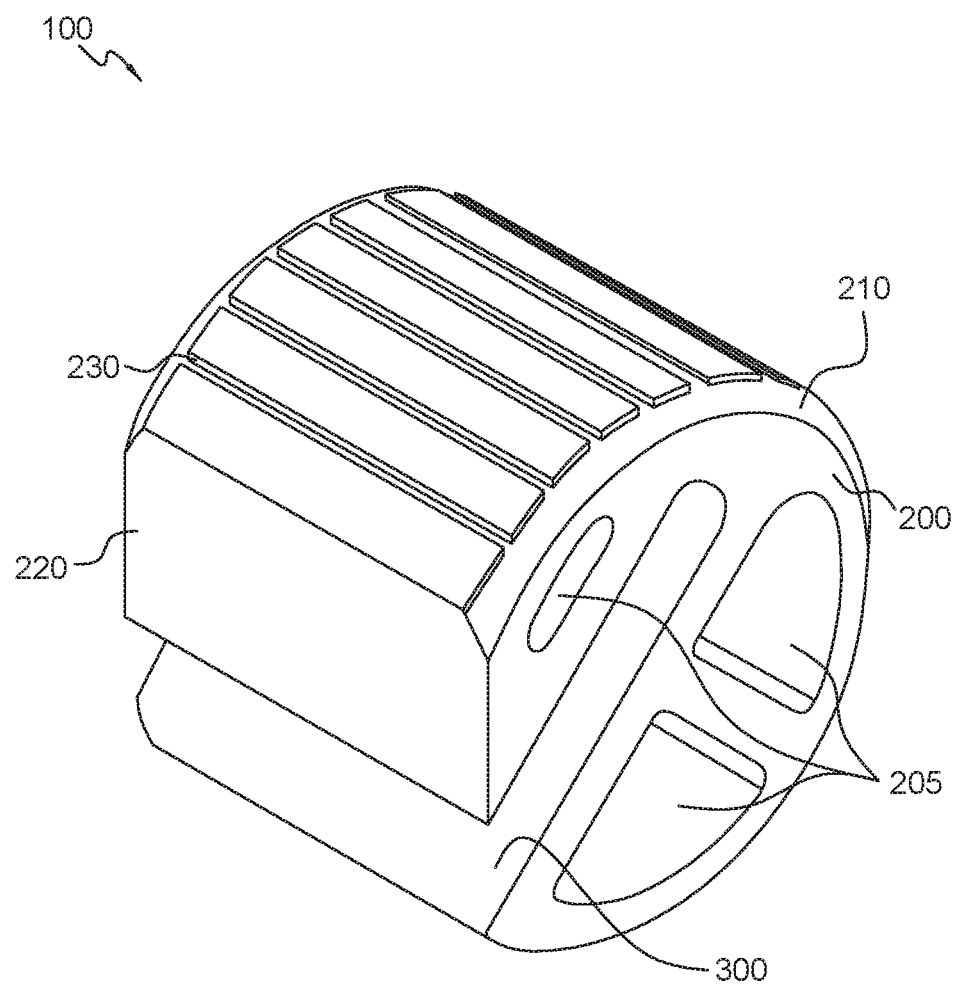
FIG. 1 is an isometric view of a cleat connector.

FIG. 1 is an isometric view of a cleat connector 100. The cleat connector 100 includes a substantially cylindrical body 200 and a slot 300. The body 200 includes a perimeter 210. The body 200 may also include indentations 205. The indentations 205 may extend through the body 200. The indentations 205 in the body 200 may allow the cleat connector 100 to be held in place and permit compression of the body 200 as the cleat connector 100 is installed in an opening of the back of the cabinet. This compression allows the cleat connector 100 to be pressure fitted into the cabinet. The cleat may be made out of a polymer, metal, wood, plastic, etc.

The perimeter 210 may include a flat portion 220. The flat portion 220 runs adjacent to and in line with the back of the cabinet the cleat connector 100 is installed in. The flat portion 220 allows the cleat connector 100 and back of the cabinet to sit flush against the wall the cabinet is mounted to. The flat portion 220 is adjacent to the slot 300. The perimeter 210 may also include ridges 230. The ridges 230 stabilize the cleat connector 100 and prevent the cleat connector 100 from rotating after installation in the back of the cabinet. The diameter of the cleat connector 100 corresponds to an opening in a back of the cabinet which receives the cleat connector 100. The cleat connector 100 fits snugly within the opening. Preferably, the diameter of the cleat connector 100 is approximately 20 mm within normal tolerances. However, the diameter of the cleat connector 100 may vary. The diameter may be greater or smaller than 20 mm according to the design load.

As shown in FIG. 1, the cleat connector 100 also includes a slot 300. The slot 300 extends from the perimeter 210 into the body 200. The slot 300 extends partially through the body 200. The slot 300 is configured to receive an angle or leg of the rail, track, or Z-clip. The angle and size of the slot 300 corresponds to the structure the cabinet is mounted to, such as the angle or leg of the rail, track, or Z-clip. By receiving the angle or leg of the structure mounted to the wall, the cleat connector 100 is supported on the angle or leg of the mounted structure via the slot 300.

Figure 2:
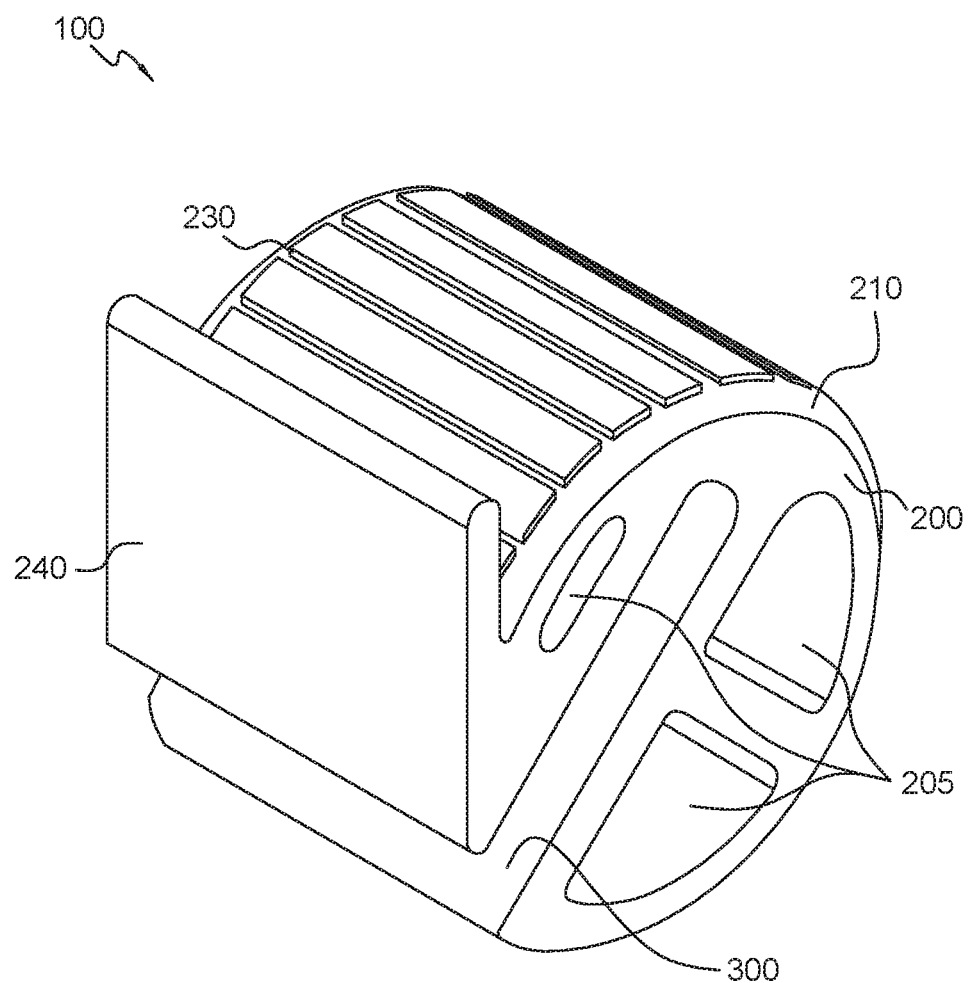
FIG. 2 is an isometric view of a second embodiment of the cleat connector.

FIG. 2 is an isometric view of a second embodiment of the cleat connector 100. As shown in FIG. 2, the cleat connector 100 may also include a flange 240. The flange 240 is located adjacent to the slot 300 and extends beyond the perimeter 210. Once installed in the cabinet, a back of the flange 240 abuts the back of the cabinet and thereby aligns the cleat connector 100 in the cabinet. The flange 240 also prevents the cleat connector 100 from rotating in the opening of the cabinet. Like the flat portion 220 of the cleat connector 100 in FIG. 1, a front of the flange 240 sits flush against the wall the cabinet is mounted to.

Figure 3:
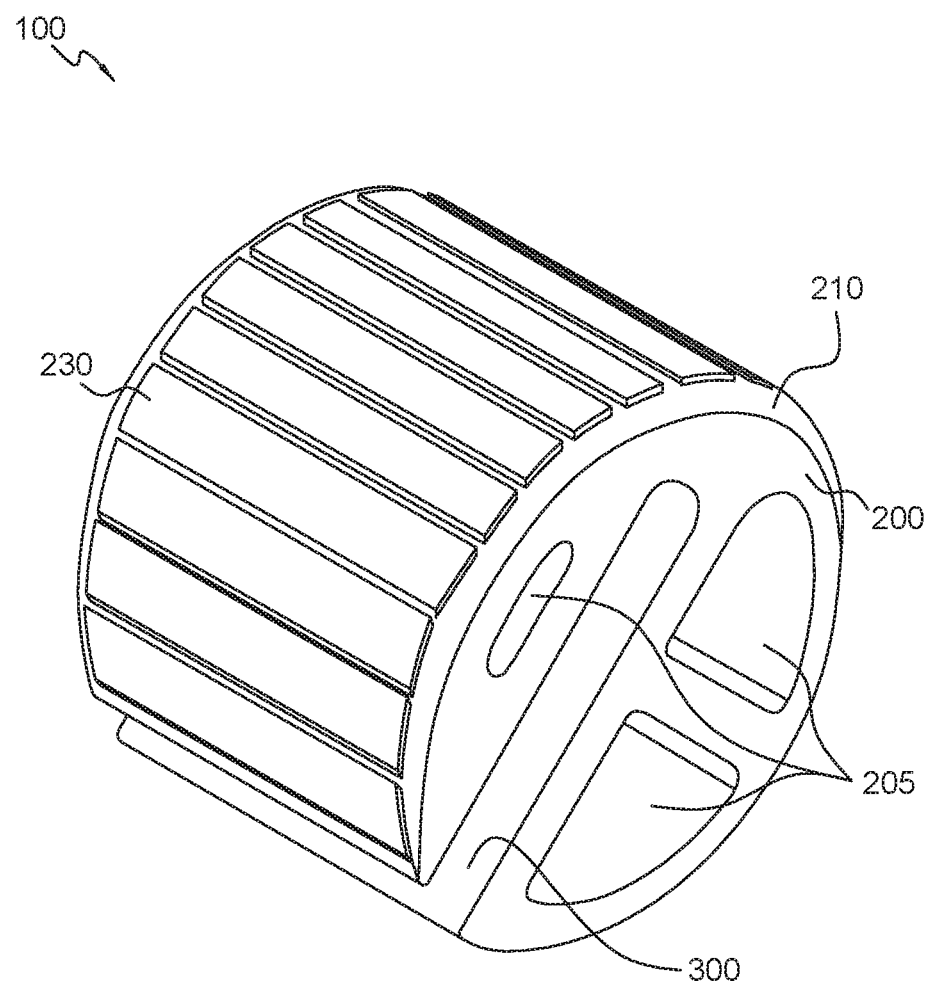
FIG. 3 is an isometric view of a third embodiment of the cleat connector.

FIG. 3 is an isometric view of a third embodiment of the cleat connector 100. As shown in FIG. 3, the cleat connector 100 may be substantially cylindrical without the flat portion 220 shown in FIG. 1 and without the flange 240 shown in FIG. 2. Because there is no flat portion 220 or flange 240, the cleat connector 100 may be rotated slightly within the opening of the cabinet to adjust for normal tolerances. For example, if the angle or leg of the rail, track, or Z-clip is slightly off, the cleat connector 100 may be rotated within the opening of the cabinet so that the cabinet may remain flush against the wall. Other properties of the cleat connector 100, such as size and material, prevent the cleat connector 100 from rotating freely within the opening due to friction.

Figure 4:
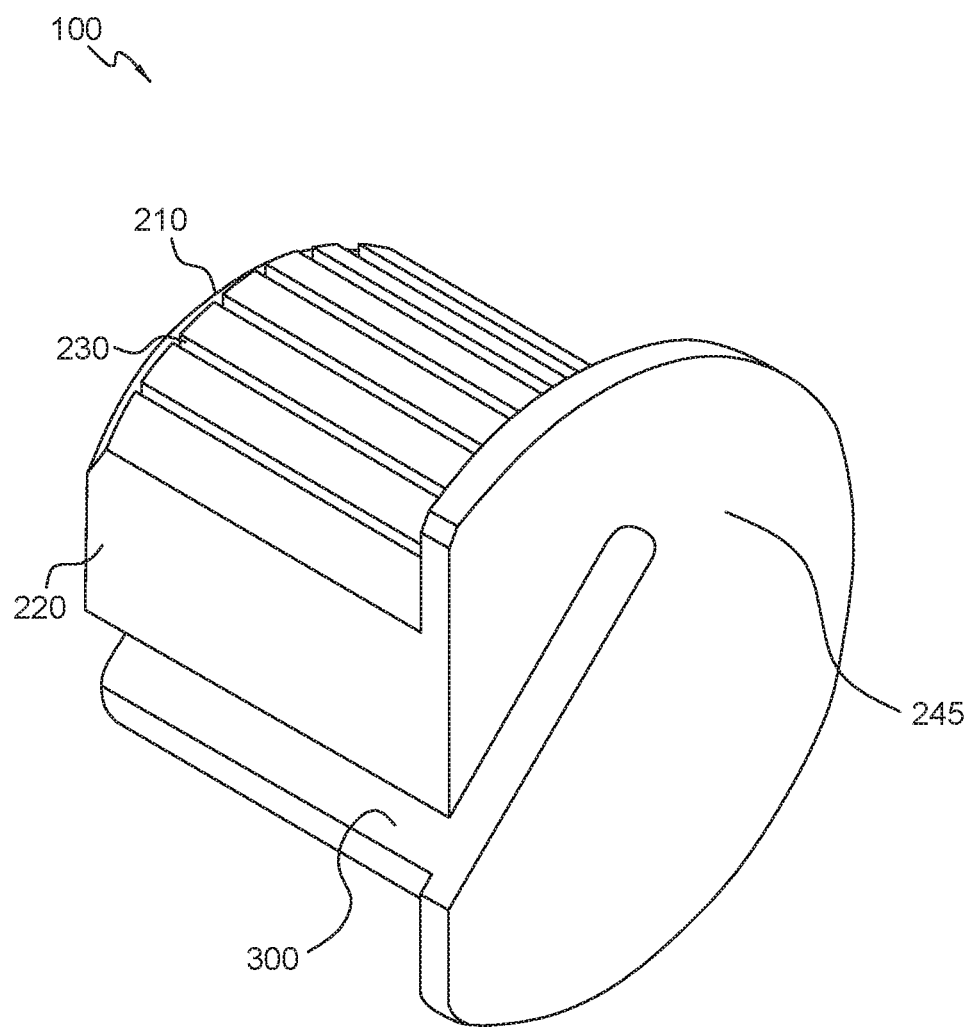
FIG. 4 is an isometric view of a fourth embodiment of the cleat connector.

FIG. 4 is an isometric view of a fourth embodiment of the cleat connector 100. As shown in FIG. 4, the cleat connector 100 may also include an edge 245. The edge 245 extends beyond the perimeter 210 of the cleat connector 100. Once the cleat connector 100 is inserted into the cabinet, the edge 245 abuts the side of the cabinet and the body of the cleat connector inserts into the opening in the cabinet. The extended edge 245 allows the cleat connector 100 to be quickly and easily installed in the cabinet by ensuring the cleat connector 100 is sufficiently inserted into the opening until the side of the cabinet meets the edge 245 and by preventing the cleat connector 100 from being inserted too far into the cabinet.

Figure 5:
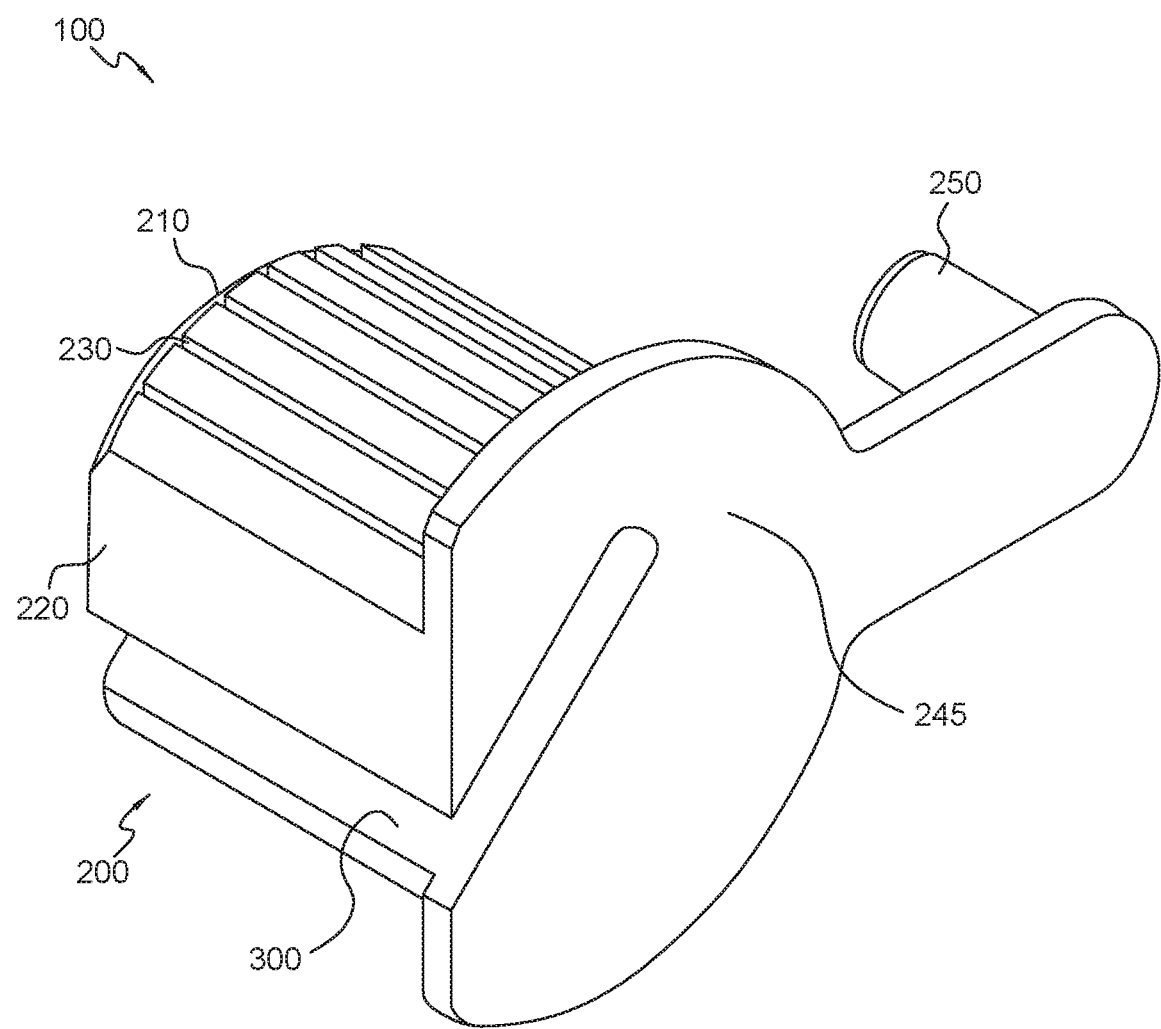
FIG. 5 is an isometric view of a fifth embodiment of the cleat connector.

FIG. 5 is an isometric view of a fifth embodiment of the cleat connector 100. As shown in FIG. 5, the cleat connector 100 may include an alignment pin 250. The alignment pin 250 is attached to the edge 245. Alternatively, the alignment pin 250 may be attached to the perimeter 210. The alignment pin 250 runs parallel to the substantially cylindrical body 200. The alignment pin 250 inserts into a second opening in the cabinet. The substantially cylindrical body 200 inserts into the first opening in the back of the cabinet, and the alignment pin 250 inserts into a second corresponding opening further within the cabinet. The alignment pin 250 stabilizes the cleat connector 100 once inserted into the cabinet by aligning the cleat connector 100 and preventing the cleat connector 100 from rotating.

Figure 6:
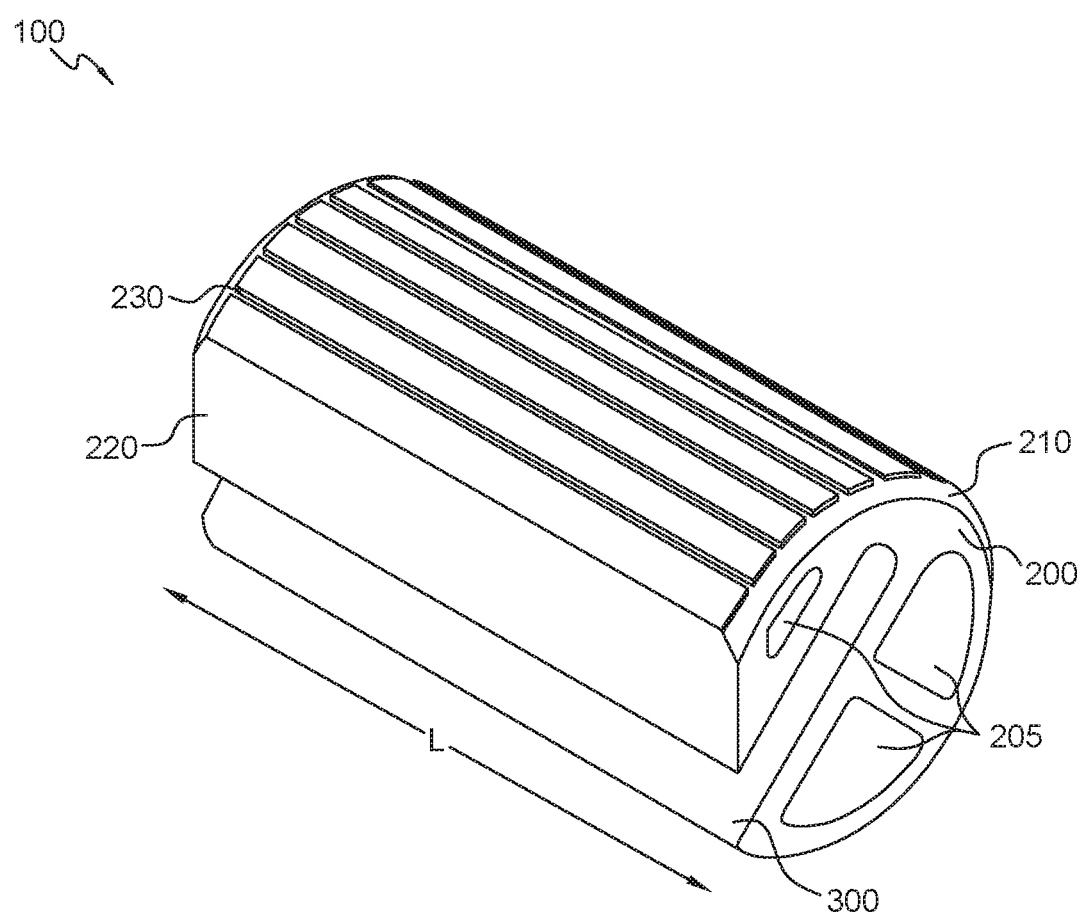
FIG. 6 is an isometric view of a sixth embodiment of the cleat connector.

FIG. 6 is an isometric view of a sixth embodiment of the cleat connector 100. As shown in FIG. 6, the cleat connector 100 may vary in length L. For instance, as shown in FIG. 6, the cleat connector 100 may be a double-wide cleat connector 100. The double-wide cleat connector 100 shown in FIG. 6 may accommodate two connecting cabinets. Although not shown, the cleat connector 100 may also be shorter in length L. The length of the cleat connector 100 depends on the design load.

Figure 7:
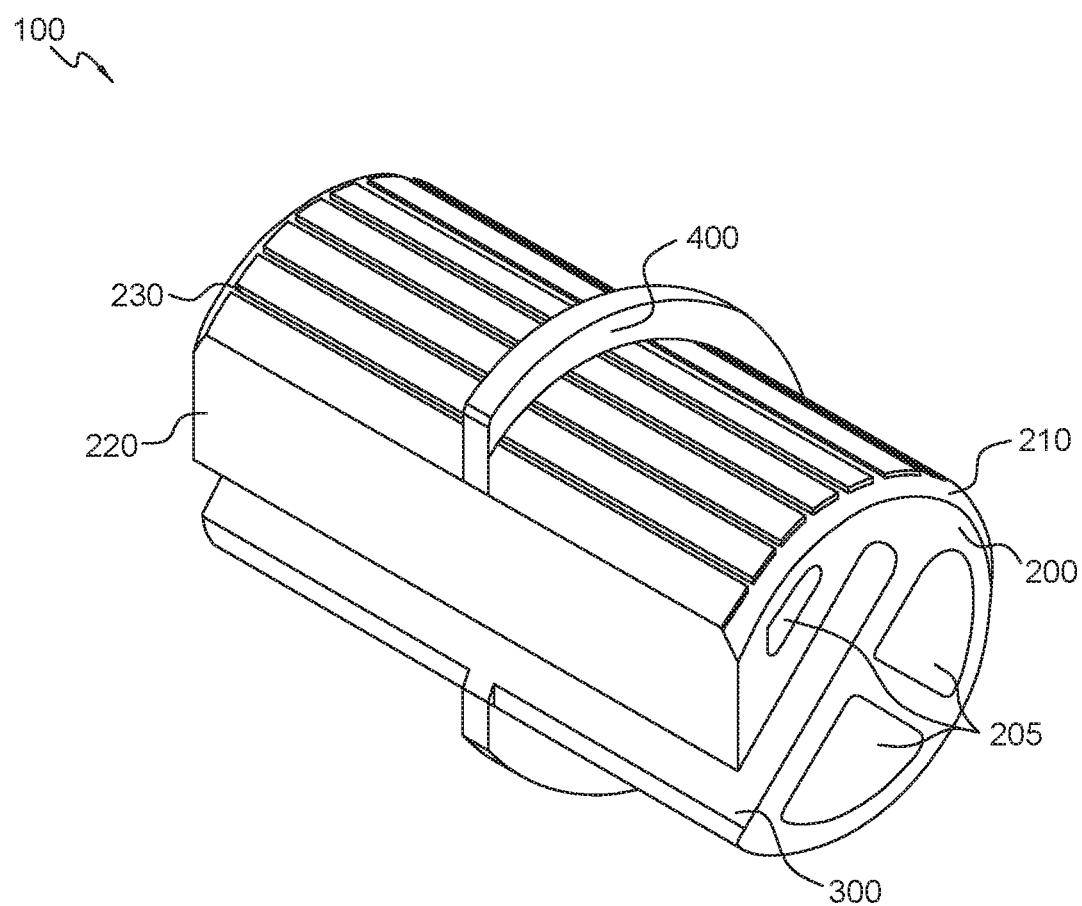
FIG. 7 is an isometric view of a seventh embodiment of the cleat connector.

FIG. 7 is an isometric view of a seventh embodiment of the cleat connector 100. As shown in FIG. 7, the cleat connector 100 may include a central pin 400. When two or more cabinets are installed side by side, two or more cleat connectors 100 may be aligned with the central pin 400. Alternatively, a double-wide cleat connector 100 may include the central pin 400 substantially in the center of the substantially cylindrical body 200. The central pin 400 fits between two cabinets with a first end of the substantially cylindrical body 200 inserting into an opening in the first cabinet and a second end of the substantially cylindrical body 200 inserting into an opening in the second cabinet. The central pin 400 aligns the two cabinets and ensures that a sufficient amount of the substantially cylindrical body 200 is inserted in each cabinet.

Figure 8:
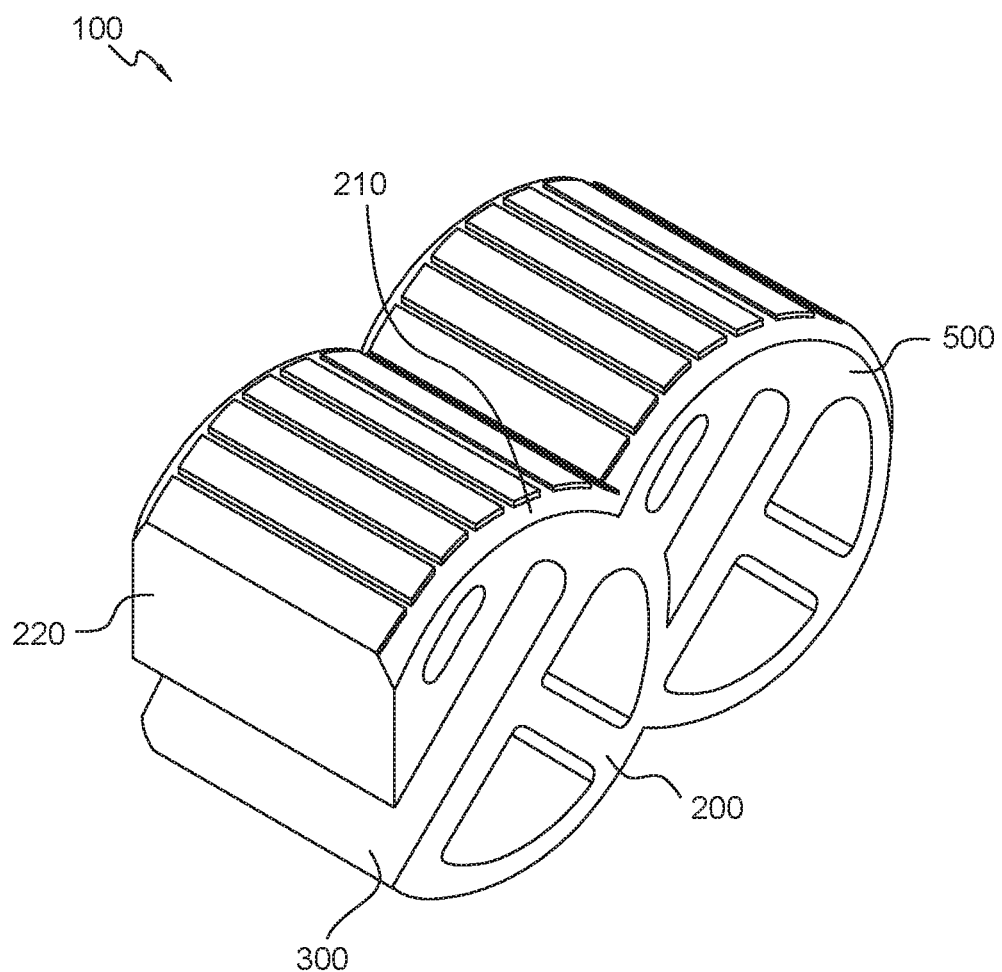
FIG. 8 is an isometric view of an eighth embodiment of the cleat connector.

FIG. 8 is an isometric view of an eighth embodiment of the cleat connector 100. As shown in FIG. 8, cabinets with heavier design loads may require a cleat connector 100 including a second partial substantially cylindrical body 500 attached to the perimeter 210. A cleat connector 100 with two substantially cylindrical bodies 200, 500 provides more surface area for the cabinet to bear on, and thus, can carry a heavier load. The opening in the cabinet corresponds to the two connected substantially cylindrical bodies 200, 500.

The cleat connector 100 may include a combination of the embodiments shown in FIGS. 1-8. The design of the cleat connector 100 may vary according to the design of the cabinet and the design load. For instance, the cleat connector 100 may include a flat portion 220 and a second partial substantially cylindrical body 500, as shown in FIG. 8.

Figure 9:
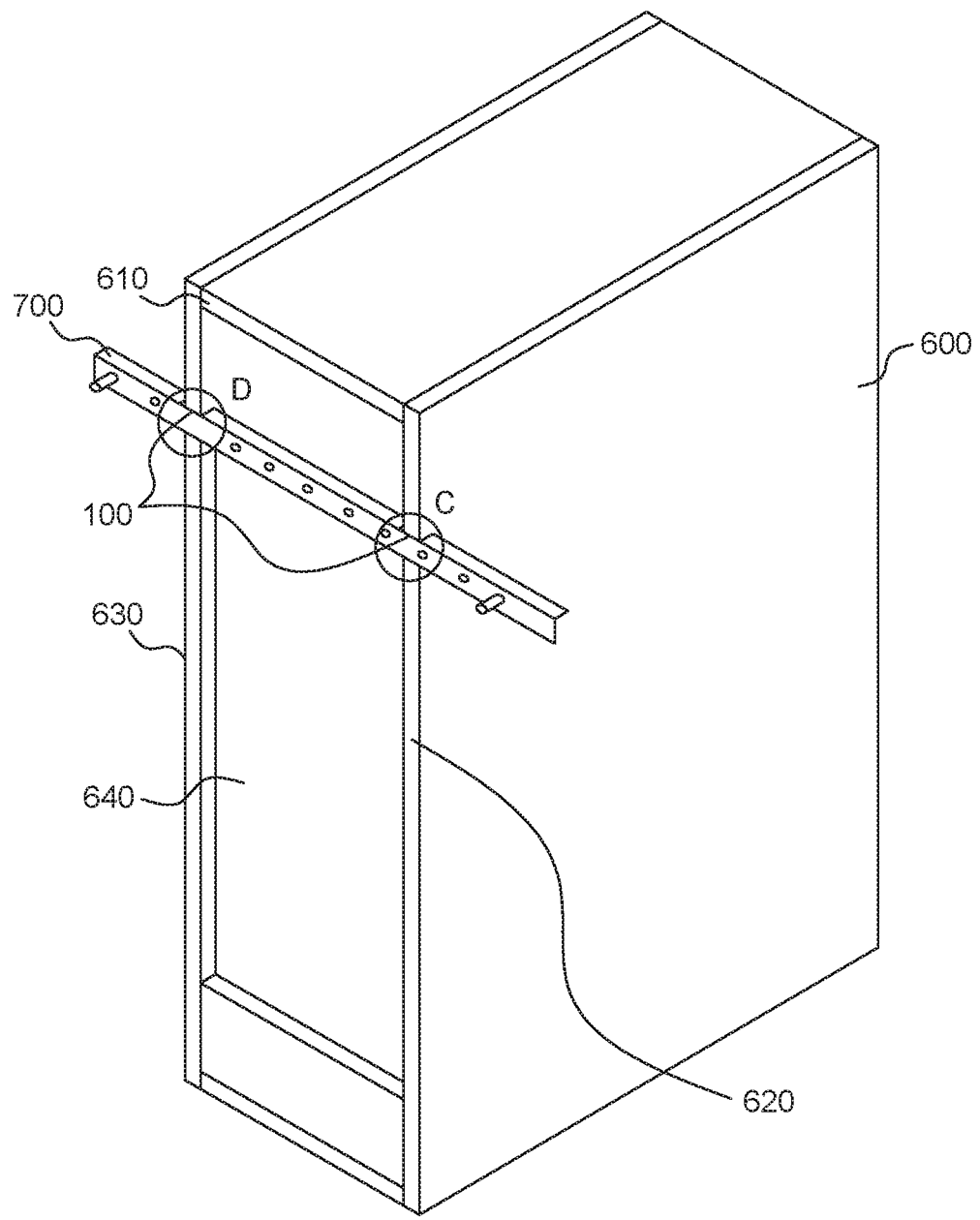
FIG. 9 is an isometric view of the cleat connectors used in conjunction with a cabinet and rail.

FIG. 9 is an isometric view of the cleat connectors 100 used in conjunction with a cabinet 600 and rail 700. As shown in FIG. 9, cleat connectors 100 may be used to mount a cabinet 600 to a wall. The cabinet 600 includes a back 610. The back 610 includes a first side 620 and a second side 630. A back panel 640 of the cabinet 600 may be inset from the back 610 of the cabinet 600. As shown in FIG. 9, the cabinet 600 includes two cleat connectors 100. A cleat connector 100 is installed in the first side 620 and a cleat connector 100 is installed in the second side 630. The cleat connectors 100 are concealed by the back panel 640. Although the cabinet 600 in FIG. 9 includes two cleat connectors 100, the cabinet 600 may include more than two cleat connectors 100 and may be mounted at more than one location depending on design loads. A rail 700, as shown in FIG. 9, a track, or a Z-clip is attached to the wall. The cabinet 600 is mounted to the rail 700. More than one rail 700 may be attached to the wall to mount the cabinet 600 at multiple locations. The rail 700 may be a continuous rail and support multiple cabinets 600. The cleat connectors 100 are located in the cabinet 600 so that the supporting structure, such as the rail 700 is substantially horizontal.

Figure 10B:
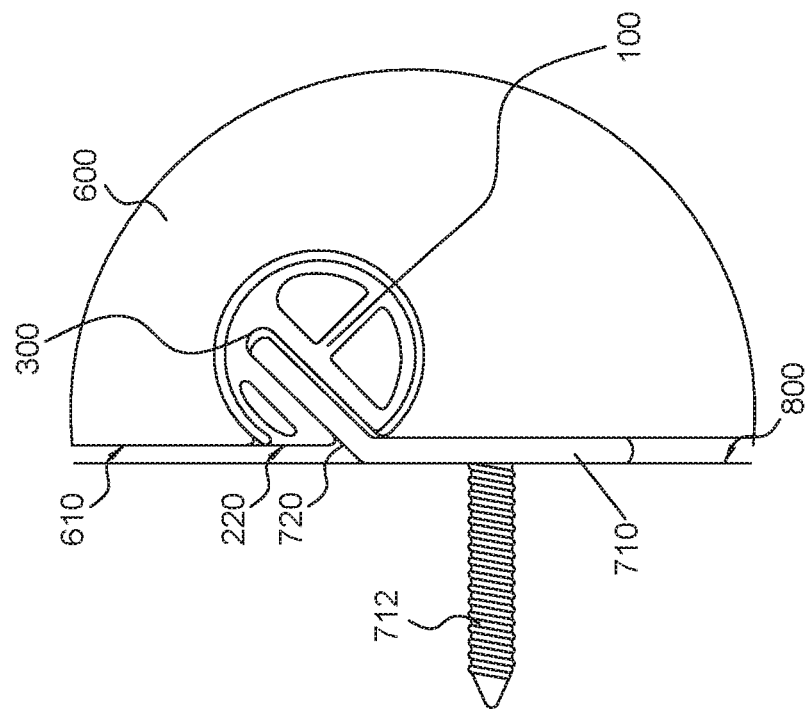
FIG. 10B is a right side view of FIG. 10A.
Figure 10A:
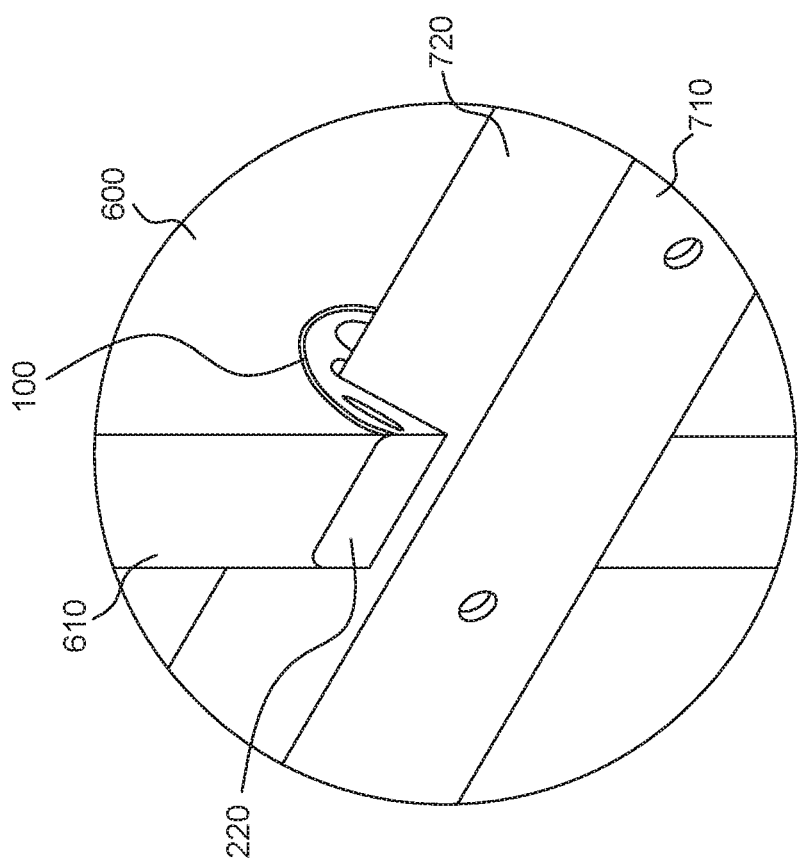
FIG. 10A is a magnified view of area C in FIG. 9.

FIG. 10A is a magnified view of area C in FIG. 9. FIG. 10B is a right side view of FIG. 10A. As shown in FIGS. 10A and 10B, the cleat connector 100 is inserted into a cut out or opening in the back 610 of the cabinet 600. The rail 700 includes two flanges 710, 720. As shown in FIGS. 10A and 10B, the first flange 710 may include a row of drilled holes. The first flange 710 is mounted to a wall 800 with the second flange 720 extending away from the wall 800 at an angle. The first flange 710 may be mounted to the wall 800 by inserting fasteners 712 through the predrilled holes and into the wall 800, as shown in FIG. 10B. In one embodiment, the second flange 720 extends away from the wall 800 at approximately 45 degrees. However, the second flange 720 may extend away from the wall 800 between 0-90 degrees. The cabinet 600 is mounted to the rail 700 by sliding the slot 300 of the cleat connector 100 onto the second flange 720. The angle and length of the slot 300 corresponds to the angle and length of the second flange 720. For instance, if the second flange 720 extends away from the wall 800 at a 45 degree angle, the slot 300 extends from the perimeter 210 of the cleat connector 100 into the body 200 at approximately 45 degrees relative to the axis of the wall 800. As shown in FIGS. 10A and 10B, the first cleat connector 100 includes a flat portion 220. When the cleat connector 100 is inserted into the cabinet 600, the flat portion 220 aligns with the back 610 of the cabinet 600.

Figure 11B:
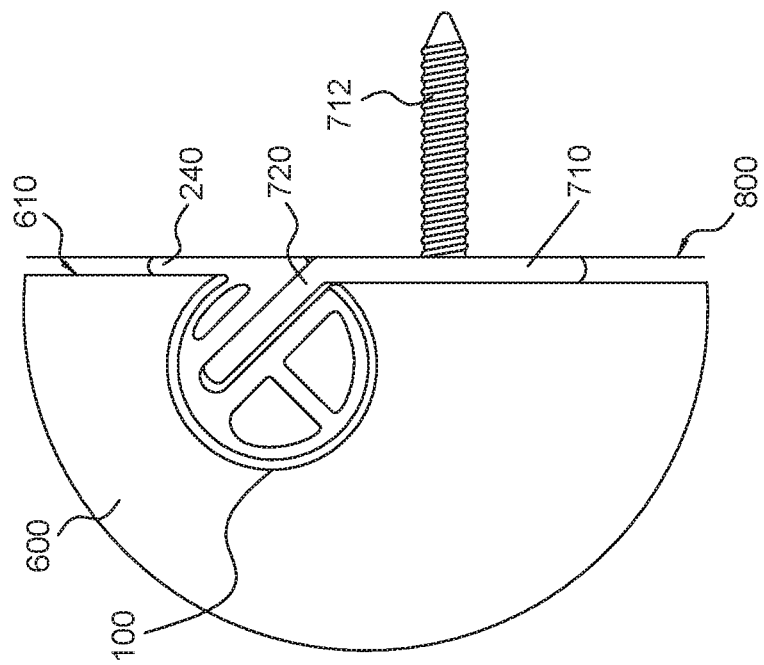
FIG. 11B is a left side view of FIG. 11A.
Figure 11A:
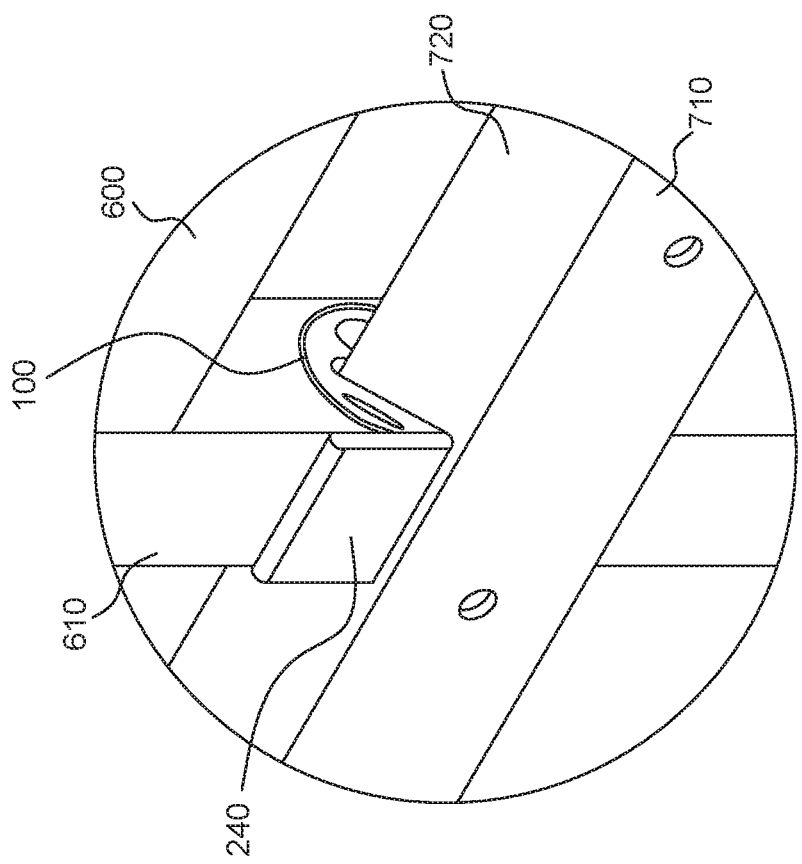
FIG. 11A is a magnified view of area D in FIG. 9.

FIG. 11A is a magnified view of area D in FIG. 9. FIG. 11B is a left side view of FIG. 11A. As shown in FIGS. 11A and 11B, the second cleat connector 100 may be the same or different design as the first cleat connector 100. For instance, as shown in FIGS. 11A and 11B, the second cleat connector 100 may include a flange 240. The flange 240 aligns the cleat connector 100 in the cut out or opening of the cabinet 600. As shown in FIGS. 11A and 11B, the flange 240 abuts the back 610 of the cabinet 600 and prevents the cleat connector 100 from rotating. Alternatively, the first and second cleat connectors 100 may be the same design and include any combination of the embodiments previously discussed.

FIG. 12 is a flow chart of a method of installing a cabinet 1200. The method of installing a cabinet 1200 includes the following steps. Step 1210 includes receiving a cabinet. The cabinet includes a first cleat connector installed in a first opening in a back of the cabinet and a second cleat connector installed in a second opening in the back of the cabinet. Each cleat connector includes a substantially cylindrical body including a perimeter. Each cleat connector includes a slot extending from the perimeter partially into the body. Each cleat connector may include additional embodiments previously discussed. Step 1220 includes installing a mounting structure such as a rail. The mounting structure may be installed prior to or after the cabinet is received. The mounting structure includes a first flange and a second flange. The first flange is attached to the wall. The second flange is attached to the first flange and extends away from the wall at an angle. The mounting structures may include the same embodiments previously discussed. Step 1230 includes sliding the second flange of the rail into the slot of the first cleat connector and the slot of the second cleat connector. The cleat connectors bear on the mounting structure attached to the wall and the cabinet is attached to and bears on the cleat connectors. The cabinet is thereby installed to the wall via the cleat connectors.

Having thus described in detail a preferred selection of embodiments of the present invention, it is to be appreciated and will be apparent to those skilled in the art that many physical changes could be made to the cleat connector 100 without altering the inventive concepts and principles embodied therein. The present embodiments are therefore to be considered in all respects as illustrative and not restrictive, the scope of the invention being indicated by the appended claims rather than by the foregoing description, and all changes which come within the meaning and range of equivalency of the claims are therefore to be embraced therein.

What is claimed is:

1. A cleat connector comprising:
   a substantially cylindrical body having a perimeter and a diameter configured to be received in an opening in a back of a cabinet, the back of the cabinet configured to abut a mounting surface;
   a slot extending from the perimeter partially into the body, the slot is configured to receive a mounting structure; and
   a flange attached to the perimeter adjacent to the slot configured to extend out past the opening and along the back of the cabinet.

2. The cleat connector of claim 1, wherein the perimeter includes a flat portion adjacent to the slot.

3. The cleat connector of claim 1, wherein the perimeter includes ridges.

4. The cleat connector of claim 1, wherein the diameter is approximately 20 mm.

5. The cleat connector of claim 1, wherein the slot includes a length that is approximately 15.87 mm.

6. The cleat connector of claim 1, further including an edge that extends past the perimeter.

7. The cleat connector of claim 1, further including an alignment pin attached to the perimeter.

8. The cleat connector of claim 1, further including a second partial cylindrical body attached to the perimeter.

9. A cabinet comprising:
   a back side including a first end and a second end, the first end having a first opening and the second end having a second opening, the back side configured to abut a mounting surface;
   a first cleat connector inserted in the first opening; and
   a second cleat connector inserted in the second opening;
   wherein the first cleat connector and the second cleat connector each includes a substantially cylindrical body having a perimeter and a diameter that corresponds to the first opening and the second opening, a slot extending from the perimeter partially into the body, and a flange attached to the perimeter adjacent to the slot that extends out past the opening and along the back side.

10. The cabinet of claim 9, wherein the perimeter includes a flat portion adjacent to the slot and along a same axis as the back side.

11. The cabinet of claim 9, wherein the perimeter includes ridges.

12. The cabinet of claim 9, wherein the diameter is approximately 20 mm.

13. The cabinet of claim 9, wherein the slot includes a length that is approximately 15.87 mm.

14. The cabinet of claim 9, wherein each said cleat connector further includes an edge that extends past the perimeter.

15. The cabinet of claim 9, wherein each said cleat connector further includes an alignment pin attached to the perimeter.

16. The cabinet of claim 9, wherein each said cleat connector further includes a second partial cylindrical body attached to the perimeter.

17. A method of installing a cabinet comprising:
receiving the cabinet, the cabinet including a first cleat connector installed in a first opening in a back of the cabinet and a second cleat connector installed in a second opening in the back of the cabinet, each said cleat connector includes a substantially cylindrical body having a perimeter, a slot extending from the perimeter into the body, and a flange attached to the perimeter adjacent to the slot that extends out past the opening and along the back of the cabinet;
installing a rail having a first flange and a second flange by attaching the first flange to a wall with the second flange extending away from the wall at an angle; and
sliding the second flange of the rail into the slot of the first cleat connector and the second cleat connector.

18. The method of claim 17, wherein the angle is between 0 and 90 degrees.

\* \* \* \* \*